UNITED STATES PATENT OFFICE.

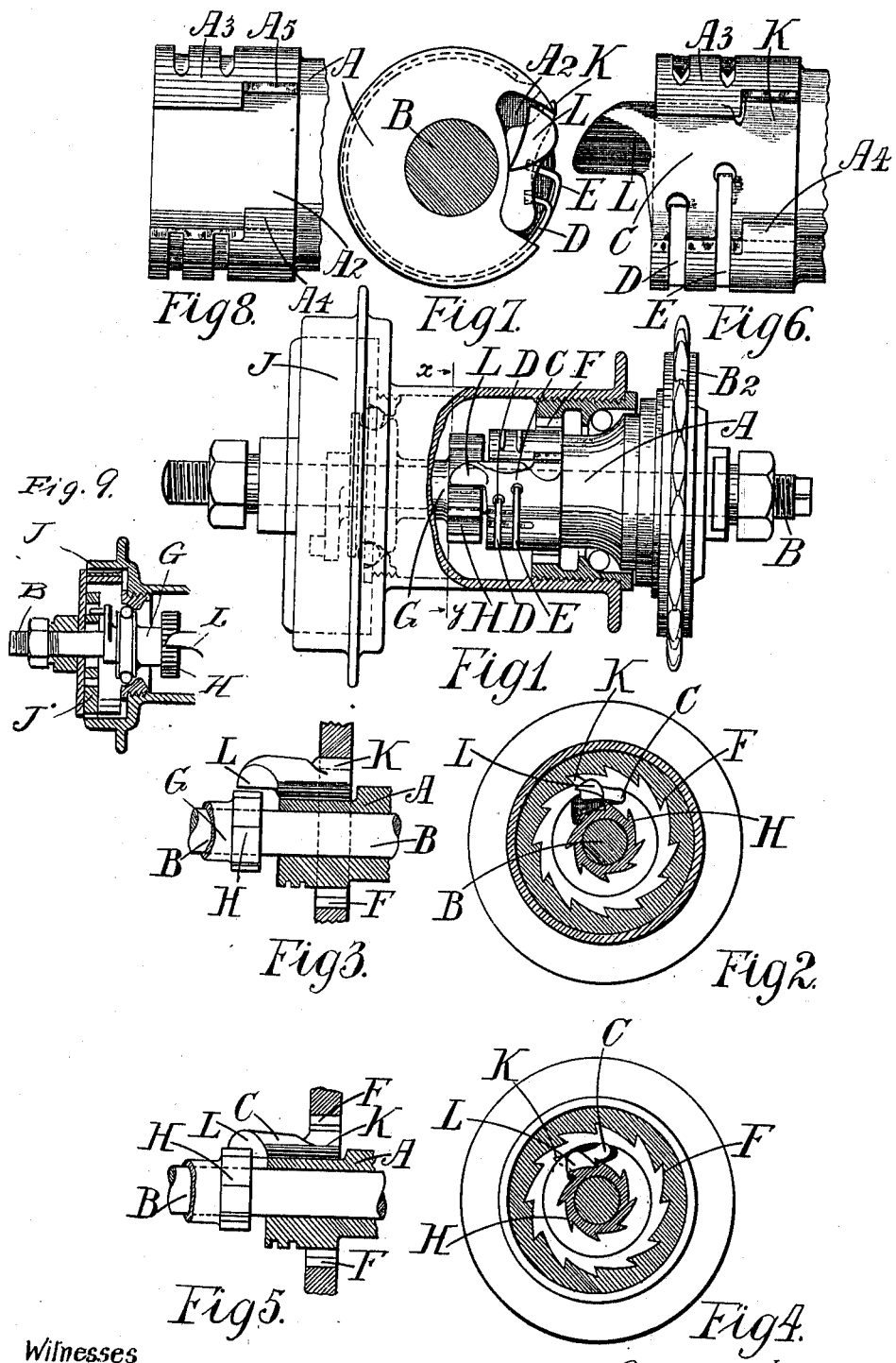

STANLEY COOPER, OF SOLIHULL, ENGLAND.

COASTER-HUB FOR CYCLES AND THE LIKE.

993,760.  Specification of Letters Patent.  Patented May 30, 1911.

Application filed November 18, 1909. Serial No. 528,683.

*To all whom it may concern:*

Be it known that I, STANLEY COOPER, a subject of the King of Great Britain, residing at Solihull, in the county of Warwick, England, have invented certain new and useful Improvements in Coaster-Hubs for Cycles and the Like, of which the following is a specification.

This invention has for its object to provide a simple and cheap construction of coaster hub for cycles and the like which will have a positive action in both directions, and high efficiency.

The majority of coaster hubs at present employed utilize a quick thread and nut which travels laterally to engage by friction either the hub shell or a brake device. As friction is relied upon slipping is liable to occur, and to insure the nut moving in relation to the screw thread a drag spring is used, which sets up friction while the hub is in use.

This invention has for its object to provide a simple and cheap construction of coaster hub for cycles and the like, having a double acting pawl for driving and applying the brake, which will be positive in action and not liable to damage under any circumstances.

The accompanying drawings show how the invention may be carried into effect.

In these, Figure 1 is a partial vertical section of a coaster hub. The actual brake is not illustrated clearly as it may be of any suitable type and forms no part of the invention. Fig. 2 is a transverse section on the line $x$—$y$ of Fig. 1, showing the parts in the driving position. Fig. 3 is a longitudinal section of the same. Fig. 4 is a sectional view on the line $x$—$y$, corresponding to Fig. 2, showing the parts in the position either for free wheeling or braking. Fig. 5 is a longitudinal section of the same. Fig. 6 is a plan view of the pawl in position, while, Fig. 7 is an end view of the same. Fig. 8 is a plan view of a detail. Fig. 9 is a vertical sectional view, partly in elevation, of the drum on the wheel hub, showing the brake within said drum.

Like letters indicate like parts throughout the drawings.

The driving sleeve A is mounted upon a ball race upon the fixed spindle B in the usual manner, and it carries the driving sprocket $B^2$. The driving sleeve may also take any suitable bearing on the fixed spindle, this bearing being either of the ball or plain type, according to requirements. In a recess $A^2$ in the driving sleeve A is arranged the pawl C. This is held in place by a pair of springs D and E, which need not be of the exact type illustrated.

Carried by the hub shell, as by screwing or otherwise, is the driving ratchet ring F, the hub shell being mounted upon suitable bearings, such as illustrated.

Free to rotate on the fixed spindle is a brake operating sleeve G which carries a ratchet ring H with teeth set in the opposite direction to those on the ring F. This braking sleeve G, when rotated backward, applies the brake J' which may be of any suitable type contained within the drum J in the well-known manner. As this brake and its operation forms no part of the invention it need not be specifically described nor illustrated.

It will be seen that the pawl C is provided with two engaging noses K and L arranged in opposite directions and adapted to engage the ratchets F and H respectively.

Briefly, the operation is as follows:—As the driving sleeve A is rotated forward the pawl C is carried around with it, causing the part L to move in relation to the stationary ratchet H. This raises the pawl, bringing the nose K into engagement with the ratchet teeth F, thus establishing a positive connection between the driving sleeve A and ratchet ring F and hub shell. When it is desired to free-wheel the sprocket is held stationary in the usual manner, the ratchet ring F overrunning the pawl K in the usual manner. To apply the brake the driving sleeve A is rotated backward, moving the pawl C in relation to the ratchet ring F. The pawl C therefore drops, under the action of the springs D and E, into engagement with the brake ratchet H. Reversal of the driving sleeve A therefore carries around the brake ratchet H and sleeve G, applying the brake.

It will be seen that a positive connection between the driving sleeve and the two ratchet rings is obtained in both directions so that friction is not relied upon and slipping is not likely to occur. It will be noticed also that no drag spring is employed, the springs D and E merely serving to hold the pawl in place. Therefore no unnecessary friction is set up at any time.

It is stated above that the engagement of the pawl with the ratchet ring F was effected by the sliding of the pawl up the ratchet teeth H. This is the case, but unless provision is made to prevent it the pawl portion L would click over the braking ratchet during forward pedaling. This is obviated by undercutting the ratchet teeth F or making them of sufficient length and depth. The nose K is therefore engaged with the ratchet F by the action of the part L on the ratchet teeth H but the driving pressure forces it farther up the teeth of the ratchet ring F, drawing the part L perfectly free from the ratchet teeth H and preventing any clicking during forward pedaling. This is shown clearly in Figs. 2 and 3, and it constitutes an important feature of the invention.

It will be understood that, as so far described, when free-wheeling occurs the pawl must rise and fall as it clicks over the driving ratchet F. This might not be possible with an ordinary rocking pawl owing to the part L striking the tops of the teeth on the ring H, see Fig. 2. However, by employing a pawl such as C, which merely floats and has no rigid pivot it is free to rock laterally. That is to say, the part L can rise and fall without the same movement being imparted to the part K. In this manner any unnatural stress on the pawl is obviated at all times. To prevent any clicking during free-wheeling it is advisable and customary, to slightly rotate backward the sprocket and driving sleeve A, which disengages the pawl K from the driving ring and engages the part L with the brake ratchet. This is shown in Fig. 4 and it will be seen that the driving ratchet F is perfectly free from the pawl and no clicking occurs, while the parts are in position ready for application of the brake directly the pedals are further reversed.

With reference to the springs D and E it has been found preferable to make the spring E lighter than the spring D. The spring D is employed chiefly to hold the pawl C back in its recess, while the lighter spring E tends normally to hold it down at or about its center, this being the point about which most of its rocking movement takes place. A single spring performing such functions may, however, be employed. By arranging the springs in this manner the normal tendency is for the pawl to rise perfectly flat when it is clicking over the stationary ring H. This therefore insures the engagement of the part K while the pawl is at liberty to rock laterally in case of necessity.

To prevent the pawl being forced out of the recess when applying the brake one edge of the recess may be undercut as shown at $A^3$, see Fig. 8, the pressure during braking being taken by this wall $A^3$. Preferably the diagonally opposite corner $A^4$ is similarly undercut so that when the brake is applied the pawl as a whole tends to twist being forced into the undercut corners and being held firmly. It is preferred that the depth of the brake ratchet teeth be such that the pawl is flat when fully engaged with these teeth so that no tilting of the pawl occurs. The length of the pawl K may vary according to circumstances. Where it is extended the edge of the recess has to be cut away as shown at $A^5$ in Figs. 6 and 8. Obviously the shape of the pawl may be varied according to requirements but when constructed in the above manner it is held in place in a simple and substantial manner and operates satisfactorily.

In the majority of coaster hubs in which a double acting pawl is employed or has been suggested the pawls are pivoted at or about their center or are formed angular and are rocked about their pivots or an edge to engage the different ratchets. This is effected by means of a drag spring, or other special device. In some cases no such device is provided and it is very doubtful whether such constructions are practicable unless a very large number of pawls are employed so as to insure that at least one pawl operates properly. This is overcome in the present invention by employing a pawl which is of the floating type held in a recess in the driving member and engaged with one ratchet by means of a spring. If floating pawls alone were used, as has previously been proposed, they would be uncertain in operation, and a large number would have to be provided as was the case in the prior proposed construction to insure at least one pawl operating. In the present construction by the employment of a spring the action of the movement of the pawl in relation to the ratchet referred to positively engages it with the other ratchet which is undercut, so that directly engagement takes place further pressure completes the engagement. Thus there is not doubt about the pawl engaging at once and one pawl, or at most two, is all that is necessary. An important feature is that it allows one ratchet to be of the internal type and the other of the external type, the two pawl elements being on the same half of the pawl.

In coaster hubs of this type serious damage may occur to the pawl when free-wheeling unless the pawl is perfectly clear of the driving ratchet and fully engaged with the braking ratchet. In some cases to obviate this damage the two pawl members are connected together resiliently. Such a construction is expensive and militates against efficient working. In other cases the pawls are loose in recesses and free to change their position. Such parts, owing to their not being positively acting are not reliable. The pawl used in the present invention is positively actuated to engage the ratchet as described above and at the same time it is free to rock laterally as well as backward or forward. Thus it is able to take up practically any required position without being in any sense resilient, and it can not consequently be damaged. The pawl is a double action one floating in a recess and actuated by a spring so that although it is free to rock laterally it normally lies flat and the spring holds it always in engagement with one ratchet.

What I claim as my invention, and desire to secure by Letters Patent of the United States is:—

1. In a coaster hub for cycles, the combination with a wheel hub, and spindle, of a driving member mounted on said spindle, a double-acting driving and braking pawl arranged in a recess in the driving member and having teeth-engaging noses arranged in opposite directions, a driving ratchet ring carried by the hub, a brake-operating sleeve rotatably mounted on the spindle, and a ratchet ring carried by the said sleeve, the teeth of the two rings being set in opposite directions, and adapted to be engaged by the noses on the pawl, as set forth.

2. In a coaster hub for cycles, the combination with a wheel hub, and spindle, of a driving member mounted on said spindle, a spring-pressed double-acting driving and braking pawl arranged in a recess in the driving member and having teeth-engaging noses arranged in opposite directions, a driving ratchet ring carried by the hub, a brake-operating sleeve rotatably mounted on the spindle, and a ratchet ring carried by the said sleeve, the teeth of the two rings being set in opposite directions and adapted to be engaged by the noses on the pawl, the teeth of the driving ratchet ring being undercut for the purpose set forth.

3. In a coaster hub for cycles, the combination with a wheel hub and spindle, of a double-acting driving and braking pawl arranged in a recess in the driving member and having teeth-engaging noses arranged in opposite directions, a spring bearing against said pawl, a driving ratchet ring carried by the hub, a brake-operating sleeve rotatably mounted on the spindle, and a ratchet ring carried by the said sleeve, the teeth of the two rings being set in opposite directions, and adapted to be engaged by the noses on the pawl, as set forth.

In testimony whereof I have signed my name to this specification in the presence of two subscribing witnesses.

STANLEY COOPER.

Witnesses:
ERNEST HARPER,
ETHEL M. WEBB.

---

Copies of this patent may be obtained for five cents each, by addressing the "Commissioner of Patents Washington, D. C."